United States Patent [19]

Yossifor et al.

[11] Patent Number: 5,073,932

[45] Date of Patent: Dec. 17, 1991

[54] SECURED DATA TRANSMISSION AND ERROR RECOVERY MECHANISM IN CORDLESS TELEPHONES

[76] Inventors: Oded Yossifor, 22422 Anza Ave., Torrance, Calif. 90505; Sanford M. Brown, III., 301 Via Mesa Grande, Redondo Beach, Calif. 90277

[21] Appl. No.: 575,587

[22] Filed: Aug. 31, 1990

[51] Int. Cl.⁵ ..................... H04K 1/00; H04M 11/00; G06F 11/08

[52] U.S. Cl. .................................. 380/23; 371/36; 371/41; 371/49.2; 371/65; 379/62; 380/48

[58] Field of Search ............ 379/62; 371/36, 41149.2, 371/65; 380/48, 2, 23

[56] References Cited

U.S. PATENT DOCUMENTS 3,078,443  2/1963  Rose ..................................... 371/41
3,668,631  6/1972  Griffith et al. ......................... 371/41
4,442,531  4/1984  Gupta ................................... 371/36
4,649,543  3/1987  Levine .................................. 371/41

Primary Examiner—Stephen C. Buczinski
Attorney, Agent, or Firm—Lewis Anten

[57] ABSTRACT

A novel method is disclosed that facilitates secured transmission of data between the transmitting and receiving ends of a cordless telephone by encapsulating the desired command in a message code. This message code includes synchronization, security, and error detection codes as well as the encapsulated command. Both the process that generates the security code and the process that enables recovery from errors during data transmission efficiently utilize the limited memory and processing capabilities available on the cordless telephones.

27 Claims, 2 Drawing Sheets

SECURED DATA TRANSMISSION AND ERROR RECOVERY MECHANISM IN CORDLESS TELEPHONES

BACKGROUND

Security codes are signals sent between base and handset units of cordless phones that ensure that the messages exchanged come from the proper handset or base. In order to work properly, the base should accept only messages from its particular handset, and vice-versa, and not from third party units. Using security codes for data transmission in cordless telephones is well known in the art. The FCC mandates that all cordless telephones have this feature to ensure certain minimum protection against unintentional or unauthorized line seizure. The security of cordless telephones is ensured by rejecting a dialing or command sequence from a user's cordless telephone unless accompanied by a security code that is mutually agreed upon and recognized by the transmitting and receiving ends.

A randomly generated security code is advantageous as it is unpredictable and not only reduces the probability of unauthorized usage but also enhances the exclusion of spurious interfering electrical signals generated by other sources in the vicinity.

The larger the size of the security code, the less likely it is that two randomly generated security codes from two sets of cordless telephones will match. However, large security codes tax the processing and memory resources present in most cordless phones.

Although the use of security codes in cordless telephones is widely known, such security codes have not previously been combined with error detection and recovery mechanisms. Further, such a combination has never been designed to function within the processing and memory constraints currently present in cordless telephones. This combination of security codes to prevent unauthorized access to the cordless phone coupled with error detection and recovery mechanisms presents advantages not present in either feature alone. Further, as these features operate within the memory and processing constraints of current cordless phone systems, only minor modifications need be made to current cordless phones in order to take advantage of the disclosed mechanism.

The method by which error detection recover is combined with security codes for the first time brings into the realm of cordless telephones a sophisticated means to not only protect the data, but to actually detect errors during transmission and to recover from such errors. Previously, only security codes were available with cordless telephones. With the advent of this invention, not only are security codes present in data transmission between cordless telephone handset and base, but error detection and recovery as well. Further, the addition of error detection to the security code and remaining message code does not overwhelm the memory and processing capacities of the cordless telephone. As the security code and command code are sent together within the message code, the probability of introducing errors into the message code is less than if the security, command, and error detection codes were sent separately.

The method employed for the detection and correction of errors ensures efficient utilization of the processing power of the microprocessor in the cordless telephones as the method is simple, yet very effective. Using any one of the other numerous well known methods for error detection and recovery would only result in adding to the cost of the system because they all require larger memories and more processing power than is currently available on the cordless telephones.

It must be noted however that as the cost of computer memory with increased processing speed decreases to the point where including more sophisticated error recovery means become possible, such schemes would still fall within the spirit and scope of our invention. Further, memory and processing capacity will always be limited as it can never be infinite. As cordless phone technology progresses, enhancements to our invention may be made without diverging from the core concepts disclosed herein, allowing data security and integrity to be maintained as the related arts advance.

For the sake of convenience, the means of generating security codes will be discussed separately from the means of generating error detection codes. It must be understood however, that both of them working in tandem constitute an integral part of the communication protocol disclosed herein.

OBJECTS OF THE INVENTION

It is an object of the present invention to provide a secure means for transmitting data between the handset and the base units of cordless telephones.

It is also an object of the present invention to provide means to detect errors that may be introduced during data transmission between the base and the handset units of the cordless telephones.

It is yet another object of the present invention to provide means to recover from the errors that may occur during data transmission.

It is also an object of the present invention to provide both data security and error recovery mechanisms that can effectively utilize the limited memory and processing capabilities available on a cordless telephone.

These and other objects and advantages of the present invention will become apparent from a review of the following diagrams and descriptions.

DETAILED DESCRIPTION OF THE INVENTION

Figure 1:
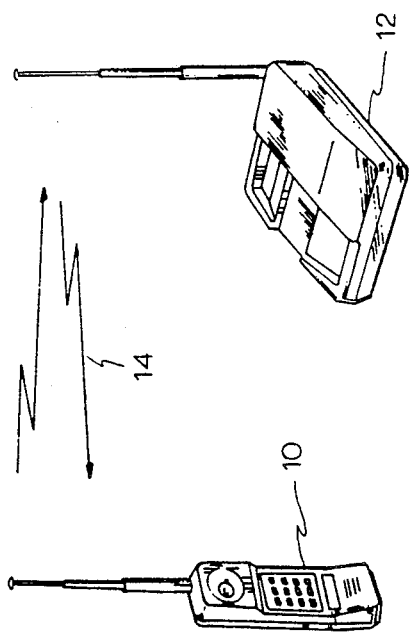
FIG. 1 shows a cordless telephone system composed of a handset and a base unit exchanging radio signals when used.

FIG. 1 shows a cordless telephone with its two component units: a handset 10 and a base 12. The handset 10 and base 12 are exchanging signals 14 which may be voice communications or message codes 16 directing the receiving unit to perform a task.

Figure 2:
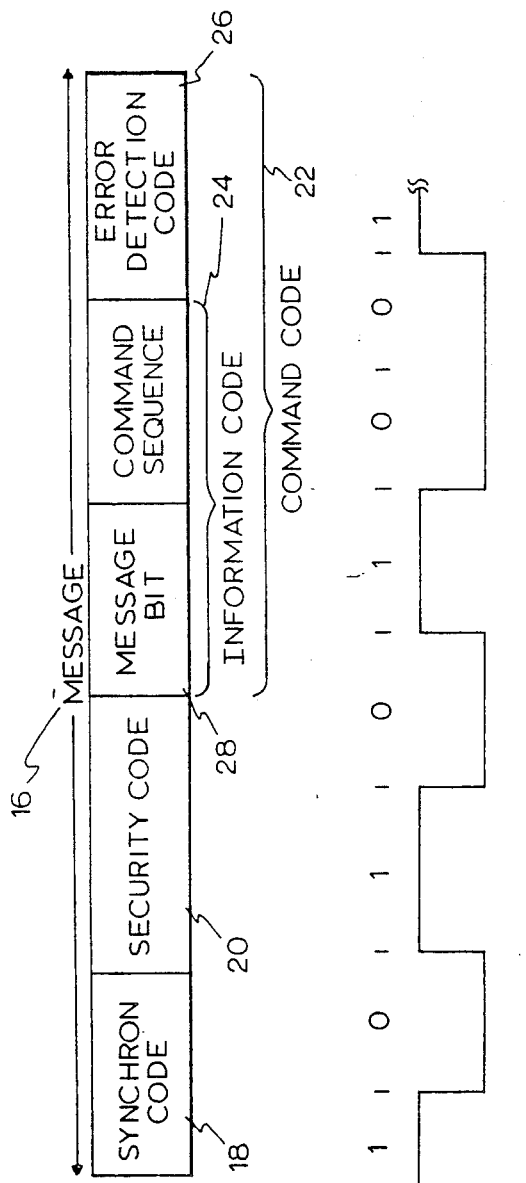
FIG. 2 is a schematic representation of the message code.

As shown in FIG. 2, the message code 16 is comprised of the following segments: the synchronization code 18, the security code 20 and the command code 22.

The command code 22 is further divided into an information code 24 and an error detection code 26. The information code 24 is composed of a message bit 28 followed by the command sequence 30 itself. The command sequence 30 contains the data being transferred by the message code 16. Such data includes a number in a sequence used to dial the cordless phone FIG. 1, or a command to ring the handset 10. The order of occurrence of these segments may be changed without affecting their functionality or usefulness. For example, the message code 16 may be designed to include the synchronization code 18 either before or after the security code 20.

The message code 16 is generated by a message code assembler 32 that generates and stores the appropriate portions of the message code 16 in series so that the appropriate message code 16 is available for transmission by the message code assembler's 32 associated transmitter 34.

In the preferred embodiment, the synchronization code 18 is a sequence of alternating 1's and 0's 4 bits long in the sequence. The purpose of this segment is to prepare the receiver 36 for an incoming message code 16 and is predominately a hardware requirement.

By using an initial sequence of 1's and 0's alternately, the threshold of the decision comparator 40 in the receiver 36 is stabilized and its deviation towards either one of the logic levels is prevented. This is required as there is a tendency for the decision comparator 40 to remain in its current state and this tendency increases with time. When several 0's are received, followed by a 1, the probability is enhanced that the 1 may not be detected as it was preceded by several 0's, which tend to keep the decision comparator 40 in its preceding state of 0. The reverse is also true when an incoming stream of 1's is followed by a 0. When incoming data 14 is not predominately one value or another, there is less of a probability that a differing incoming signal (a 1 in the face of many 0's, and vice-versa) will go undetected.

The synchronization code 18 is preferably followed by the security code 20 that is randomly generated and subject to a few conditions that eliminate certain undesired sequences from occurring. These undesired sequences occur when several bits of the incoming stream are the same. As mentioned above, when several bits are the same, there is an increased probability that a bit different from those preceding it will be missed.

The security code 20 is generated by a free running counter 21 with the undesired sequences removed by filter or filters 23. The security code 20 is stored in memory registers in both base 12 and handset 10 portions of the cordless phone FIG. 1. Such free running counters 21 and filters 23 are well known in the art. These filters are guided by the following method:

Each time a handset 10 is put in the cradle of the cordless phone base 12, a new random number is chosen from the free running counter 21 of the base 12 as the next security code 20. It is then subjected to a randomizing test to prevent too many contiguous 1's and 0's from remaining in the security code 20. Having too many 0's or 1's will increase the locking time substantially. This is especially true in the case of multi-channel phones.

As an illustrative example of this method, a security code 20 with twelve bits is considered.

The 12 bit number is split into three 4 bit numbers called nibbles. This is well in the art and easily accomplished by passing the bits to registers of memory, or to a counter, where the bit sequences can be compared, acted upon, and transferred back to the original memory from whence they came. A comparator (not shown) checks to see if all of the nibbles are equal. If the three nibbles happen to be equal, the middle nibble is incremented by 1 by a counter or some other means.

If five or more contiguous 1's or 0's are found, the bit in the 5th position is reversed. This method ensures that no more than four 1's or 0's occur contiguously.

For example, if the counter 21 is 0110,0000,1111 the randomized code is 0110,0001,1110 as there were five 0's in a row and the changing of the fifth 0 to a 1 puts five 1's in a row, requiring the last 1 to be changed to a 0.

Another example: If the counter 21 is 0000,0000,0000 after the 1st step, the code is 0000,0001,0000 as the three nibbles were equal.

After the 2nd step, the code is 0000,1001,0000 as the first five bits were all 0's.

As previously discussed, the security of cordless telephones, FIG. 1, depend on their ability to receive and process the correct security codes 20 efficiently. However, this efficiency is a trade-off between reliability and speed. The larger the size of the security code 20, the greater is its reliability since it is less likely that some other cordless unit will generate the same security code 20. But increasing the size of the security code 20 delays the locking of the transmitter 34 and the receiver 36. Conversely, by reducing the size of the security code 20, the locking time is reduced but at the expense of reduced security. The present method uses a security code 20 size large enough to be reliably secure yet small enough to be easily handled by a cordless phone FIG. 1.

Following the security code 20 is the command code 22 segment composed of the message bit 28, the command itself in the information code 24 (the message bit 28 and command sequence 30 composing the information code 24), and the error detection code 26.

The message bit 28 alternates with each message code 16 transmission between the binary states of 1 and 0. This helps the receiver 36 distinguish between a new message code 16 and its repetition or retransmission. To illustrate its function, if a user dials the telephone number "345678" using the cordless handset 10, the first digit "3" is transmitted by the handset 10. The corresponding message bit 28 may be either a 1 or a 0, but for the present a 1 is assumed. Now for the second digit "4", the corresponding message bit 28 will be 0. For the third digit "5", it will be 1 and for the fourth digit "6", it will be 0 again. In order to ensure proper reception of data, the receiver 36 will signal the transmitter 34 if data was properly received. In the art, this is known as an acknowledgement (ACK) signal and is performed by conventional circuitry all well known in the art. If the transmitting handset 10 did not receive an ACK from the receiving base 12 for the third digit, the handset 10 would assume that the base 12 did not receive the third digit and therefore retransmit the unacknowledged data digit "5". The base 12 might have already received the third digit but its ACK might not have been received by the handset 10. By looking at the message bit 28 however, the base 12 can ascertain if the data sent by the handset 10 is a retransmission or a new digit. If the previous message bit 28 was a 1 and the current message bit 28 is also 1, the base 12 knows that the previous digit is being retransmitted as the message bit 28 did not alternate from 1 to 0. If not, the base 12 knows that it is a new digit. The diagram below shows this.

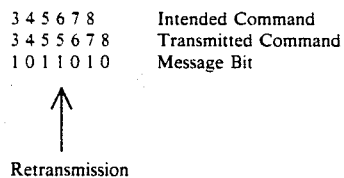

```
3 4 5 6 7 8    Intended Command
3 4 4 5 6 7 8  Transmitted Command
1 0 1 1 0 1 0  Message Bit
```

Retransmission

Should there be an error in the message bit 28, the error detection code 26 will reveal this as explained below, and the error can be corrected.

Following the message bit 28 is a 5 bit command sequence 30 that is used to represent the entire repertoire of commands that are used for communication between the handset 10 and the base 12. Examples of the commands are: PAGE, HOLD, RING, each of the 10 digits, and the 2 characters "*" and "#". Only a limited subset of the 32 ($2^5$) commands that are theoretically possible are used because some bit sequences have too many adjacent 1's and 0's and so are not used for the reasons already explained above.

There are two types of error detection methods used in the present invention. The first type is the Majority Vote (MV) method where an incoming bit sample is compared to its neighbors. The MV method can be used for all incoming transmissions 14. The second type is the parity checking method where a code is generated in a particular manner from the data to be protected from corruption by error. When examined together, if the data and the code do not still share the particular relationship present when the code was generated, an error has been detected and the appropriate action (such as retransmission) is taken. The parity checking method is good only for the data that the code accompanies. Parity checking is specific for certain data, Majority Vote is general and can be used for all received data. The following is a detailed discussion of their structures and the context in which each of them are used.

The MV error detection method is used to increase the bit detection probability, which is the ability to distinguish between 1's and 0's. Since the handset 10 and the base 12 use different oscillators (different clocks), there could be a slight mismatch or overlap between the transmitted data and the sampled (or received) data. The MV error correction codes help in reducing such overlaps.

Figure 3:
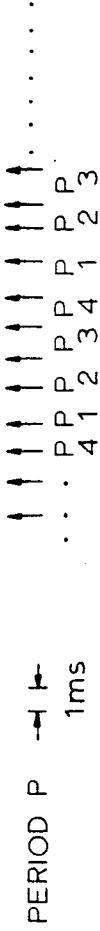
FIG. 3 is a schematic representation of a transmission bit stream, with each transmission bit lasting 4 milliseconds, and the accompanying receiving bit stream, with each sample of the transmission bit stream taken by the receiver occurring every millisecond.
Figure 4:
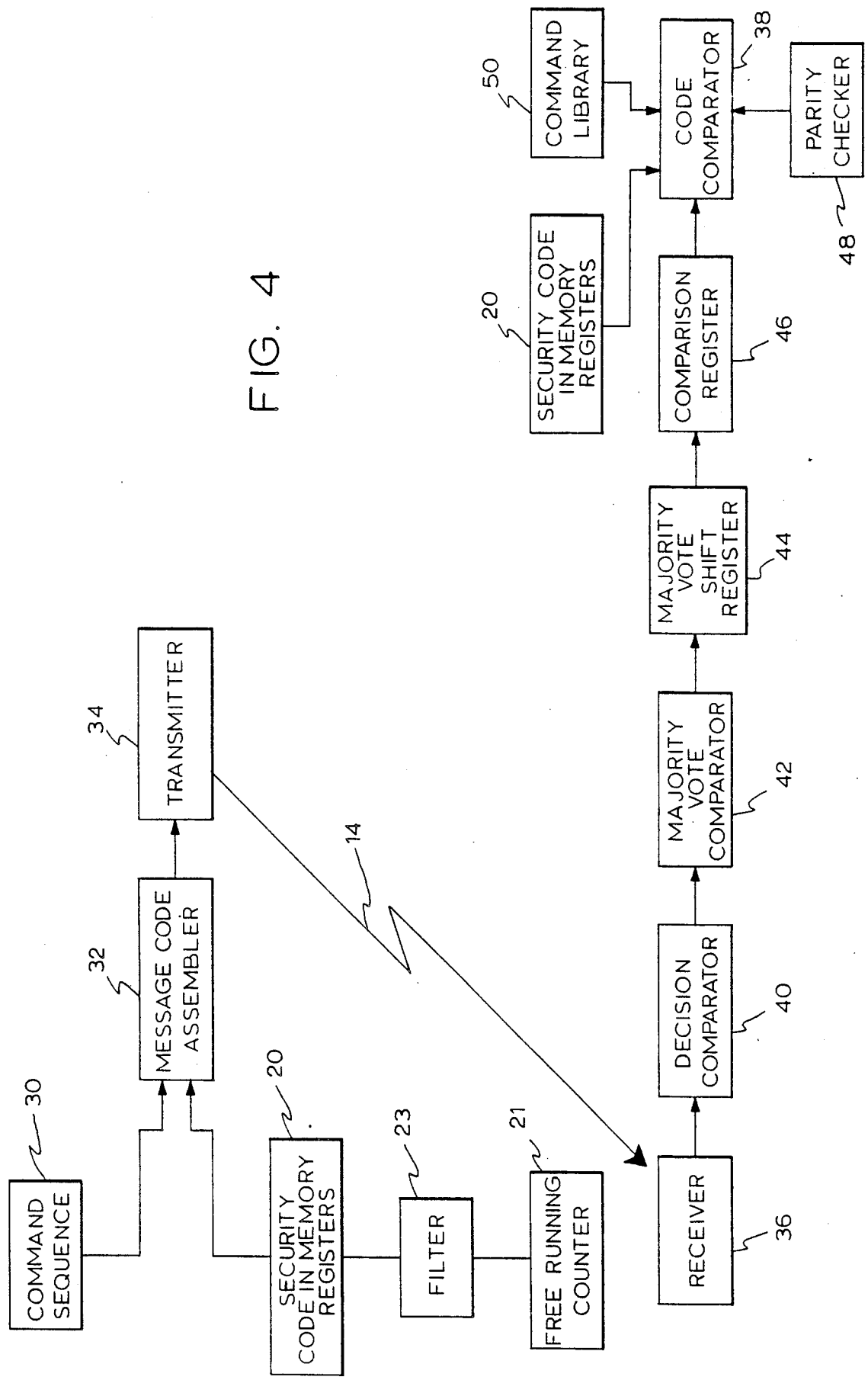
FIG. 4 is a block diagram showing the generation, transmission, reception, and analysis of message codes as described herein.

In the MV error detection method, the receiving unit continuously scans for the message code 16 at a predetermined sampling rate that is preferably several times the transmitting rate. In the preferred embodiment of the present invention, and as shown in FIG. 3, the receiving unit (either handset 10 or base 12) samples at four times the rate of the transmission unit (either base 12 or handset 10, respectively). This sampling is performed by a decision comparator 40 that determines the value, either 1 or 0, of the sample and records in memory the value of that bit stream sample. The following example illustrates this principle.

If the transmitter 34 transmits each bit of the entire message code 16 for a duration of 4 milliseconds, whereas the receiver 36 samples at the rate of 1 millisecond, the receiver 36 thus samples the transmission at four times the transmission rate. For every bit transmitted, there are four samples taken by the receiver 36 unit. By having the transmitted value sampled several times by the receiver 36, multiple samples of each bit of the transmitted code are taken, thereby reducing by repetition the possibility of error. Whatever value, either 1 or 0, that predominates (or alternatively, is consecutive) in the taken sampling is the value that is used by the receiver 36 as the value that was transmitted by the transmitter 34. The four individual samplings may be subjected to the Majority Vote of 3 method as discussed below in order to lessen the chance of error in reception.

Except for the times of initial start up when the handset 10 is removed from the base 12 and final end when the handset 10 is replaced in its cradle (where transients of many kinds are present) every scan or sample taken by the receiver 36 is preceded and followed by several scans or samples. In the Majority Vote of 3 (MV-3) error detection method used in the preferred embodiment, a sliding set of 3 samples are compared to generate the value to be used in detecting elements of the message code 16. The majority of those 3 samples is determined by a majority vote comparator 42 and entered into a majority vote shift register 44. A new sample is then taken and compared with the last two samples for a new majority to be taken. The oldest sample is discarded, while the latest 2 are compared with the new third sample in order to provide a new value for the majority vote shift register 44. This process is continually repeated while the handset 10 is removed from its cradle in the base 12.

In the preferred embodiment, the majority vote shift register is 48 bits long which provides 4 sampling bits for each of the 12 bits of the predetermined security code 20. Each 4 bit segment of the majority vote shift register 44, of which there are 12, can be considered to represent the 4 samples taken of an incoming transmitted bit. For the purposes of this invention, it does not matter that these 4 samples fall across two incoming transmitted bits as contradictory values are discarded when the later comparison to the predetermined security code 20 takes place.

In an alternative embodiment, the majority vote shift register comprises 4 separate registers, each register 12 bits long. The samples are placed into each register in turn so that the first bit positions of each register are filled with samples first before the second bit positions are filled. Each register then contains the code to be tested against the predetermined security code 20 or the commands library 50. When two consecutive registers match, a valid code (either security code 20 or a command in the commands library 50) is deemed present. This alternative embodiment functions much like the preferred embodiment except where the preferred embodiment stores the incoming bit stream serially, the alternative embodiment stores the incoming bit stream in parallel.

After the majority vote shift register 44 has a sufficient number of values, the middle two bits of the first 4 bit segment are passed to first memory positions in a comparison register 46. If the code comparator 38 finds that these two bits match each other and also the first bit of the predetermined security code 20, then the middle two bits of the next 4 bit segment is passed by the majority vote shift register to second adjacent memory positions in the comparison register 46. These two bits are compared to each other and the second bit of the predetermined security code 20 by the code comparator 38. If these three bits match, the process is again repeated for the remaining bits of the predetermined security code 20.

If any of the middle bits do not match, or they do not match the corresponding bit of the predetermined security code 20, the first and oldest bit in the majority vote shift register 44 is discarded, a new majority vote shift register bit is taken from the MV-3 samples in the majority vote comparator 42, and the process is repeated as the previous attempt at finding a valid and verified security code 20 failed.

If all the middle bits passed to the comparison register 46 by the majority vote shift register 44 do indeed match the corresponding bits of the security code 20, a valid security code 20 is deemed to have been received by the receiver 36.

In the preferred embodiment, when a valid and verified security code 20 has been received, the next 12 bits received by the receiver 36 are deemed to be the command code 22 portion of the message code 16, unless there should be a detectable error in reception of the command code 22. A detectable error in transmission occurs when either the message bit 28 is wrong for the message code 16 or when the error detection code 26 does not appropriately match the information code 24.

When a valid and verified security code 20 is received by the receiver 36 and a detectable error occurs in the command code 22 segment, the receiver 36 can signal the transmitter 34 that an error has occurred by either sending a negative acknowledgement (NAK) signal or by not sending an acknowledgement (ACK) signal. Such signals are common and well known in the art and performed by conventional circuitry. As the transmitter 34 expects an acknowledgement from the receiver 36 for every signal sent 14, both NAK and the absence of ACK signals serve to notify the transmitter 34 that the message 16 needs to be retransmitted.

When a valid and verified security code 20 is received by the receiver 36, the following command code 22 is received, validated, and verified in much the same manner as the security code 20. First, samplings are taken of the incoming signals 14 by the receiver 36. In the preferred embodiment, the rate of 4 samples for every transmitted bit is used. As the verified security code 20 provides a mark from which the command code 22 segment can be determined, the continuous sampling that takes place for an incoming security code 20 need not take place as the next 12 bits received will be deemed to be a command code 22, if valid. Like the security code 20, the command code 22 is also 12 bits long and can be handled using the Majority Vote of 3 (MV-3) method described above, the 48 bit majority vote shift register 44, and the comparison register 46. However, in this case, the message bit 28 must be checked for appropriate alternation, and the error detection code 26 must be appropriate for the information code 24 (the message bit 28 and command sequence 30).

The command code 22 is recognized as a command code 22 as the preceding 12 bit sequence of the security code 20 allows the receiver 36 to determine that the next 12 bits coming in to the receiver 36 are the command code 22. As the command code 22 comes in, it is subject to the same sampling process as the security code 20. Samples are taken of incoming signals 14 and the Majority Vote of 3 (MV-3) method is used to pass bits on to the majority vote shift register 44. For any three consecutive samples, the majority value is determined and passed on to the majority vote shift register 44. The oldest sample is discarded and a new sample is added to the remaining two samples to generate a new value to be passed to the majority vote shift register 44.

When the 48 bit majority vote shift register 44 is filled, the middle two bits for each consecutive 4 bit segment is passed to the comparison register 46, just as for the security code 20. The message bit 28 is tested, the command sequence 30 verified as a valid command, and the error detection code 26 is checked to be sure that it matches appropriately the information code 24 (message bit 28 and command sequence 30). If any two associated middle bits do not match, the entire command code 22 is discarded and a NAK or no ACK is sent to the transmitter 34 to signify the requirement for a retransmission of the message code 16.

If all the middle bits match their mates, the message bit 28 is appropriate for its message code 16, the command sequence 30 is a valid command, and the error detection code 26 appropriately matches the information code 24, then an ACK is sent to the transmitter 34 and the command is executed by the receiver 36.

A variation of this method is one where the entire message code 16 is repeated several times in one burst. For example the transmitter 34 may send the message code 16 sixteen consecutive times in one burst. The receiver 36 scans and compares the security code 20 continuously until two successive ones match. This method has an advantage in terms of speed although it requires a higher processing rate.

The second method of error detection scheme is used within the command code 22 in order to prevent both false command activation when no command was sent and false activation of a command other than the intended one.

As mentioned previously, the command code 22 of the message code 16 consists of a message bit 28, the command sequence 30, and the error detection code 26. A specific embodiment wherein a 12 bit command code 22 consists of 1 message bit, 5 command bits and 6 error detection bits is herein disclosed. It should be understood however that an arbitrary number of bits can be assigned to each of the message, code and error detection bit segments.

In the preferred mode, the command code 22 uses a very efficient structure that uses merely 6 error detection bits to prevent false activation of commands Without this feature, it is quite possible that one valid command may be changed to another due to an error introduced in one or more of the bit positions.

In order to prevent the introduction of errors into the command sequence 30, the parity of the information code 24 is determined. The information code 24 is the message bit 28 plus the 5 command sequence 30 bits. The parity is the number of "1"'s present in the information code 24. 100010 has a parity of 2, which is even parity. 101010 has a parity of 3 which is odd parity.

If the parity of the information code 24 is even, then the error detection code 26 is the same as the information code 24. If the parity of the information code 24 is odd, then the error detection code 26 is the complement of the information code 24. That is, when the parity of the information code 24 is odd, then the error detection code 26 is the information code 24 where the 1's of the information code 24 have been replace by 0's, and the 0's in the information code 24 have been replaced by 1's.

If the information code 24 is 101000, the parity is even and the error detection code 26 is the same as the information code 24. The command code 22 becomes 101000 101000. A space has been added to the command code 22 to separate the information code 24 from the error detection code 26 in order to make reading and comparison easier.

If the information code 24 is 100110, the number of the 1's is 3 which is odd. The error detection code 26 is the complement of the information code 24, which is 011001. The entire command code 22 composed of the 1 message bit 28, the 5 command sequence 30 bits, and the 6 error detection bits 26 becomes 100110 011001. Again, with a space introduced.

Suppose that an error is introduced during transmission at the fourth bit location in the above example, i.e., 100110 is changed to 100010. The parity checker 48 will not accept the message because the error detection code 26 corresponding to the altered command sequence 30 would be 100010, where as the error detection code 26 still remains 011001.

The validity of a command code 22 is verified by a parity checker 48 that splits the command code 22 into 2 six bit portions and verifies that the error detection code 26 matches the information code 24 according to the method described above. The parity checker 48 is signalled by the code comparator 38 when the code comparator 38 finds a valid security code 20 in the comparison register 46 as the next 12 bits are deemed to be the command code 22 of the message code 16. Should the parity checker 48 find that the error detection code 26 does not match the information code 24, the information code 24 with its associated command 30 is discarded and a NAK or no ACK is sent to the transmitter 34.

At least four errors must occur in the code at 4 specific locations during transmission for the one command sequence 30 to be changed into another valid command sequence 30. The probability of this happening is so extremely low that for all practical purposes it is assumed to not occur. Such an arrangement introduces an effective, albeit rudimentary, form of error correction. By rejecting those sequences that contain errors and requesting their retransmission until a correct one is received, the objective of error correction is achieved.

While the present invention has been described with regards to particular embodiments, it is recognized that additional variations of the present invention may be devised without departing from the inventive concept.

We claim:

1. A method for securing transmission of data between transmitting and receiving units of handset and base portions of a cordless phone while maintaining integrity of the transmitted data comprising:
    transmission of a security code to ensure that random or unauthorized data is not accepted by the receiving unit;
    transmission of a message bit sequence to ensure that data is not misinterpreted;
    transmission of a command sequence comprising data sent by the transmitting unit; and
    transmission of an error detection code to ensure that errors arising within said message bit sequence and said command sequence are detected.

2. A method for securing transmission of data between transmitting and receiving units of handset and base portions of a cordless phone while maintaining integrity of the transmitted data as set forth in claim 1 wherein the method includes transmission of a synchronization code that prepares the receiving unit for an incoming message.

3. A method for securing transmission of data between transmitting and receiving units of handset and base portions of a cordless phone while maintaining integrity of the transmitted data as set forth in claim 1, wherein said security code, said message bit sequence, said command sequence, and said error detection code are incorporated within a message code that is sent as a whole from the transmitting unit to the receiving unit.

4. A method for securing transmission of data between transmitting and receiving units of handset and base portions of a cordless phone while maintaining integrity of the transmitted data as set forth in claim 3 wherein the method includes transmission of a synchronization code that prepares the receiving unit for an incoming message.

5. A method for securing transmission of data between transmitting and receiving units of handset and base portions of a cordless telephone while maintaining integrity of the transmitted data as set forth in claim 3, wherein said data integrity is maintained by both analyzing said message code for errors after said message code is received as well as receiving said message code in a manner that reduces the introduction of error into a transmitted message code during reception.

6. A method for securing transmission of data between transmitting and receiving units of handset and base portions of a cordless phone while maintaining integrity of the transmitted data as set forth in claim 5, wherein said analyzing said message code for errors comprises parity checking and said manner of reception that reduces the introduction of error comprises a Majority Vote method.

7. A method for securing transmission of data between transmitting and receiving units of handset and base portions of a cordless phone while maintaining integrity of the transmitted data as set forth in claim 3, wherein errors in transmitted data are recovered by retransmission of said message code by the transmitting unit to the receiving unit.

8. A method for securing transmission of data between transmitting and receiving units of handset and base portions of a cordless phone while maintaining integrity of the transmitted data as set forth in claim 4, wherein said synchronization code comprises a predetermined bit sequence of bits of alternating values.

9. A method for securing transmission of data between transmitting and receiving units of handset and base portions of a cordless phone while maintaining integrity of the transmitted data as set forth in claim 1, wherein said security code is randomly generated.

10. A method for securing transmission of data between transmitting and receiving units of handset and base portions of a cordless phone while maintaining integrity of the transmitted data as set forth in claim 9, wherein said security code is generated by the base portion of a cordless phone system and transferred to the handset portion of said cordless phone system before the handset portion is separated from the base portion.

11. A method for securing transmission of data between transmitting and receiving units of handset and base portions of a cordless phone while maintaining integrity of the transmitted data as set forth in claim 9, wherein said security code is generated by a free running counter.

12. A method for securing transmission of data between transmitting and receiving units of handset and base portions of a cordless phone while maintaining integrity of the transmitted data as set forth in claim 9, wherein said security code is filtered to ensure that excessively contiguous bit sequences are removed or altered.

13. A method for securing transmission of data between transmitting and receiving units of handset and base portions of a cordless phone while maintaining integrity of the transmitted data as set forth in claim 9, wherein:
said security code is 12 bits long;
a first 4 bit sequence of said 12 bit security code is compared to second and third 4 bit sequences of said 12 bit security code and if said three 4 bit sequences are equal, then said second 4 bit sequence is incremented by one; and
if 5 contiguous bits of said 12 bit security code are the same, then a fifth bit of said 5 bit sequence is complemented.

14. A method for securing transmission of data between transmitting and receiving units of handset and base portions of a cordless phone while maintaining integrity of the transmitted data as set forth in claim 1, wherein said message bit sequence comprises a sequence that alternates with each message code.

15. A method for securing transmission of data between transmitting and receiving units of handset and base portions of a cordless phone while maintaining integrity of the transmitted data as set forth in claim 14, wherein said message code is retransmitted by the transmitting unit to the receiving unit if said error detection code is not appropriate for said parity of said message bit sequence and said command code sequence.

16. A method for securing transmission of data between transmitting and receiving units of handset and base portions of a cordless phone while maintaining integrity of the transmitted data as set forth in claim 1, wherein said message bit sequence comprises a single bit.

17. A method for securing transmission of data between transmitting and receiving units of handset and base portions of a cordless phone while maintaining integrity of the transmitted data as set forth in claim 1, wherein said command sequence is of sufficient length to convey a command from the transmitter to the receiver and said command sequence does not contain excessively contiguous bit sequences of the same value.

18. A method for securing transmission of data between transmitting and receiving units of handset and base portions of a cordless telephone while maintaining integrity of the transmitted data as set forth in claim 1, wherein said error detection code comprises:
a series of bits of length equal to that of the length of said message bit sequence and said command sequence;
of same value as said message bit sequence and said command sequence if parity of said message bit sequence and said command sequence is even; or
of complemented value of said message bit sequence and said command sequence if parity of said message bit sequence and said command sequence is odd.

19. A method to secure transmission of data between transmitting and receiving units of handset and base portions of a cordless phone while maintaining integrity of the transmitted data by transmitting a message code comprising:
a synchronization code of alternating values 4 bits long, said synchronization code preparing said receiving unit for an incoming message code;
a randomly generated security code generated by a free running counter, said security code transferred from the base portion of a cordless phone to the handset portion of said cordless phone before the handset is removed from the base portion, said security code being evaluable in first, second, and third equal length segments, said second segment being incremented by one if all three said segments have the same value, and said security code having all excessively contiguous sequences of equal valued bits being altered so that said excessively contiguous sequences are no longer excessively contiguous;
a message bit that alternates value with each message code;
a command sequence comprising data transmitted from a transmitting unit for reception by a receiving unit, said command sequence containing no excessively contiguous sequences of equal valued bits; and
an error detection code of length same as length of said message bit and said command sequence, said error detection code being the same as said message bit and said command sequence if parity of said message bit and said command sequence is even, but said error detection code being complement to said message bit and said command sequence if parity of said message bit and said command sequence is odd.

20. A method to secure transmission of data between transmitting and receiving units of handset and base portions of a cordless phone while maintaining integrity of the transmitted data by transmitting a message code as set forth in claim 19, wherein said security code is 12 bits long.

21. Circuitry means for generation, verification, and validation of a message code transmitted and received by handset and base portions of a cordless telephone, wherein said circuitry means comprises:
a free running counter for the generation of a security code within said message code;
memory registers for the storage of said security code within both handset and base portions of said cordless telephone;
at least one decision comparator within receiving portions of both handset and base portions of said cordless telephone that samples an incoming bit stream at a rate significantly greater than transmitting portions of both handset and base portions of said cordless telephone;
at least one majority vote comparator that compares consecutive samples of an incoming bit stream by a Majority Vote method;
at least one majority vote shift register for the storage of values generated by said majority vote comparators;
a comparison register that stores two middle bits of four bit values of said majority vote shift register; and
a code comparator that compares said two middle bits stored in said comparison register to each other and a corresponding bit of a known, predetermined code.

22. The circuitry means for generation, verification, and validation of a message code transmitted and received by handset and base portions of a cordless telephone as set forth in claim 21, wherein said known, predetermined code comprises said security code.

23. The circuitry means for generation, verification, and validation of a message code transmitted and received by handset and base portions of a cordless telephone as set forth in claim 21, wherein said known, predetermined code comprises a command.

24. The circuitry means for generation, verification, an validation of a message code transmitted and received by a handset and base portions of a cordless telephone as set forth in claim 21, wherein said circuitry means further comprises a message code assembler that generates said message code by storing said security code, a message bit sequence to ensure proper message code interpretation, a command, and an error detection code said assembler making said message code available for transmission by an associated transmitter.

25. The circuitry means for generation, verification, an validation of a message code transmitted and received by a handset and base portions of a cordless telephone as set forth in claim 24, wherein said message code stores a synchronization code that prepares a receiver for an incoming message.

26. The circuitry means for generation, verification, and validation of a message code transmitted and received by handset and base portions of a cordless telephone as set forth in claim 21, wherein said code comparator signals a parity checker when values stored in said comparison register are equal to corresponding values of a security code, said parity checker then checking an error detection code incorporated within an immediately incoming command code, allowing execution of said command code if said error detection code is valid and denying execution of said command code if said error detection code is invalid.

27. The circuitry means for generation, verification, and validation of a message code transmitted and received by handset and base portions of a cordless telephone as set forth in claim 21, wherein a transmitting unit of said cordless telephone retransmits said message code when a transmitted message code is received containing errors.

* * * * *